(12) United States Patent
Blick

(10) Patent No.: US 8,882,097 B2
(45) Date of Patent: Nov. 11, 2014

(54) REPLACEABLE SAWING SURFACE DEVICE AND METHOD

(76) Inventor: John Blick, Laguna Beach, CA (US)

( * ) Notice: Subject to any disclaimer, the term of this patent is extended or adjusted under 35 U.S.C. 154(b) by 357 days.

(21) Appl. No.: 13/118,420

(22) Filed: May 28, 2011

(65) Prior Publication Data

US 2012/0299230 A1 Nov. 29, 2012

(51) Int. Cl.
 *B23Q 3/00* (2006.01)
(52) U.S. Cl.
 USPC ........................................ 269/303; 269/289 R
(58) Field of Classification Search
 CPC ........ B62D 7/20; B25B 11/00; B25B 11/005; B23C 2220/00; B23C 2220/12; B23C 2270/08
 USPC .......... 269/286, 302.1, 21, 275, 303; 279/153
 See application file for complete search history.

(56) References Cited

U.S. PATENT DOCUMENTS

| 1,443,327 | A | * | 1/1923 | Tourtellot | ...................... 269/274 |
| D264,419 | S | * | 5/1982 | Dorman et al. | ................ D7/698 |
| 7,758,029 | B2 | * | 7/2010 | Lim et al. | .................. 269/289 R |
| 8,360,410 | B1 | * | 1/2013 | Rockwood | ................ 269/302.1 |

* cited by examiner

*Primary Examiner* — Lee D Wilson
*Assistant Examiner* — Jamal Daniel
(74) *Attorney, Agent, or Firm* — Curtis L. Harrington; Harrington & Harrington

(57) ABSTRACT

A system includes a sacrificial board such as a cement board and containment support lid, sometimes referred to as a saw cup, is provided for use with a vacuum hold down support to allow cutting on top of normal suction cups by providing a temporary scorable surface in an assembly that is easily installed and removed, inexpensive to own, use and handle and which enables a user to go directly back to using a CNC machine for final edging and processing of the material without having to go to another location for sawing and without having to deal with heavy and unwieldy plates. Dimensions are such that any penetration of the cutting blade is intentional and will result in controlled scarring of the cement board which does not disable continued use of the saw cup. A one-piece molded saw cup is also illustrated.

4 Claims, 5 Drawing Sheets

REPLACEABLE SAWING SURFACE DEVICE AND METHOD

FIELD OF THE INVENTION

The present invention relates to improvements in the field of quick setup work holding and support devices for sawing work. More specifically, the present invention relates to a device and method used to support heavy sheet and slab type materials of various thicknesses for dimensional cutting with circular sawing attachments such as the type employed by computer numerically controlled milling machines using typically unevenly spaced conventional vacuum hold down support devices, as well as on bridge saws and other types of saws which might be configurable for non-sawing purposes, both of which may be provided with an expendable replaceable sawing cup which includes a sacrificial material supported by a laterally registered support of a known height.

BACKGROUND OF THE INVENTION

Computer numerically controlled milling machines are used to process (such as edge finishing) sheet type materials of various material composition, shape, and dimensions and are known to also enable sawing operations. In a sawing operation, materials are held in place for processing by some weight bearing supports. The material to be cut cannot be supported directly from an unprotected table surface as the saw blade needs to cut to a depth slightly below the bottom depth of the slab of material in order to produce a clean cut. This "through material" requirement means that the material must either be supported over a table with a known, cleared path for the blade to pass, or it must be supported on a table having dressed and re-dressable sacrificial material overlying a metal table.

Both of these typical provisions for cutting material are burdensome. In the case where cutting over a known free path is required, the supports must be precisely pre-arranged to avoid cutting through the support structures. One miscalculation can cause the saw blade to strike a support and damage it or the saw blade. In the case of a re-dressable table, operations must stop once the table is scarred to the extent that it is no longer able to evenly support the material to be cut. In addition a dressed table committed to a sawing operation is limited in its other uses.

For tables which are not wholly dedicated to sawing of material, vacuum hold down supports are often used. Vacuum hold down supports using single or double sided vacuum supports positioned on the working surface of the machine are placed strategically beneath the part being processed. The bottom of the vacuum hold down support is independently held by a vacuum to the working table, and an upper vacuum member typically vacuum engages the material to be worked. In the case of vacuum supports, operators who wish to perform sawing operations have been limited to using the known free path method. Further, the placement of the vacuum hold downs to avoid sawing of the vacuum supports will normally not be in the same layout placement of the vacuum supports needed in properly supporting the slabs of material to be edge shaped.

The location and placement of the vacuum hold down supports for general shaping operations is usually dependent upon the size and weight of the material to be processed, and the type of processing which is to occur. General processing can occur with a computer numerical controlled (CNC) machine which has a spindle on which is mounted various grinding tools. CNC machines used in the stone, glass and wood industry have attachments that permit sawing of material by transferring rotational power from the vertical axis to the horizontal axis to then enable computer controlled precision guided sawing at any height and axis of rotation. The material to be sawed is typically a large thick slab of material, 2 cm, 3 cm, 4 cm, thickness and has significant weight (with the 2 cm material weighing approximately fourteen pounds per square foot and other thicknesses weighing proportionately more. This material can be granite, marble or other hard material which must be well supported and sawn completely through while maintaining adequately support until the cut is completed. When vacuum supports are used, the cutting pattern must be exactly known in advance in order to configure the cups to avoid being cut by the saw blade. Even one vacuum hold down which is improperly placed, or even one cutting error can cause severe and costly damage. Further, since most vacuum hold down devices are placed in a pattern manually, the additional requirement that the vacuum hold down devices be precisely placed will at minimum cause the setting of the vacuum supports in two configurations, a first one for the sawing operation and a second one for the edge processing operation.

Another alternative to the use of a table with a dressed surface specifically configured for sawing, has been use of a large, flat intermediate cutting material supported by vacuum supports. A large size sacrificial board assembly includes a backing made of aluminum having an aluminum thickness of about ¼ inch, and having an overall size corresponding to the size of slab material to be cut. This type of sacrificial board assembly is heavy and requires two or more workers to handle it effectively. The aluminum backed material is put into place over suction cups and then vacuumed to hold it in place. This enables less concern on where the vacuum cups are located, but has a number of disadvantages. This large piece can be very expensive, difficult to handle, and is easily damaged. Once damaged this large piece of material must be replaced at a significant cost.

What is needed is a system which enables an existing CNC machine to be used for sawing so that CNC users do not have to invest in a separate sawing machine. Conversely, a dedicated sawing machine needs to have freedom from requiring a dressable support surface so that it can utilize vacuum hold down supports. The needed system enables slab material on a CNC working table to be adequately supported, while maintaining the minimum necessary friction between the slab of material being cut and its support structure to insure that it will not shift. The needed system should both insure a good, stable, non-shifting support, while completely eliminating any damage to a permanent support structure, such as a vacuum hold down.

SUMMARY OF THE INVENTION

The invention is a combination which includes a sacrificial board and its stabilizing support which form an assembly which may be referred to as a saw cup. The support has a bottom structure which includes a vacuumable surface and a lower skirt which enables it to become registered and used in conjunction with a vacuum support. The saw cup assembly is a much quicker approach to achieving the desired results of providing a surface which is scorable by a small degree and is easily repairable and replaceable. Damage to any one small piece can be much more easily and inexpensively repaired or replaced. The suctions cups are normally provided and place for other, non-sawing operations. The cement board at the top of the saw cup can be scorably cut multiple times before replacement is required. In short, the saw cup prevents cutting into the top of the vacuum hold down support which is normally used for other operation with intentional sacrificial scoring of the saw cup. This enables double use of the vacuum hold down support which is normally used for non-sawing operations.

The non-shifting support is due to the saw cup being held in place by a vacuum (vertically located) while properly being laterally located due to a lower skirt of the saw cup containment assembly lateral engagement with respect to a vacuum hold down support. The vacuum hold down support is in turn vacuumably held down to a support table. The work piece slab is held in place by its weight and friction against the saw cup cement board. Different sizes of saw cups would be used for correspondingly different size and shape vacuum hold down supports, and it is preferable to have a saw cup which has a lower skirt which is able to laterally register with the shape of the vacuum hold down support. The range of shapes include square, rectangular, round, triangular and any other shape of support whether or not it is a vacuum support, however the use of rectangular shapes may be more efficient than round shapes because they create more vacuum force and experience a better, more efficient use of materials.

The saw cup of the invention enables CNC machine users to go back and forth between the two operations of cutting and of edge shaping with minimum time. To switch from sawing to edge and finishing operations, the saw cups are simply picked up off of the vacuum hold down supports and temporarily stored. Likewise, to switch from edge and finishing operations to sawing of the next piece of material, the saw cups are quickly and simply replaced upon the vacuum hold down supports without having to re-arrange the vacuum hold down supports. The location of the vacuum hold down supports can be pre-set and geared to a configuration associated with the shapes that will be set up for edge finishing.

The use of a conventional vacuum hold down for stable vacuum support with respect to a working table combines with a cement board which is laterally contained within and attached to a containment lid. The dimensions of the cement board and containment lid are such that any sawing will result in only slight scarring of the cement board as well as only possibly slight notching of the upper containment edges of the vertical containment walls of the containment lid, if at all.

The result is the ability to use a vacuum hold down and containment lid assembly as a support for a slab of material to be cut. Further, the cement board supported by the containment lid can be scarred many dozens or hundreds times before needing to be replaced. When a heavy slab is being processed, the weight of the slab onto the cement board supported by the containment lid is enough to prevent lateral shifting of the slab. Further, because the support areas for the material to be cut are distributed and isolated, in many cases the saw will cut material lying over a raised space over the table. A second embodiment of a containment lid provides a disposable support which can laterally register a sacrificial board and is of such inexpensive construction that it can be discarded once it has undergone a high number of sacrificial cuts in the cutting operation.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

Figure 1:
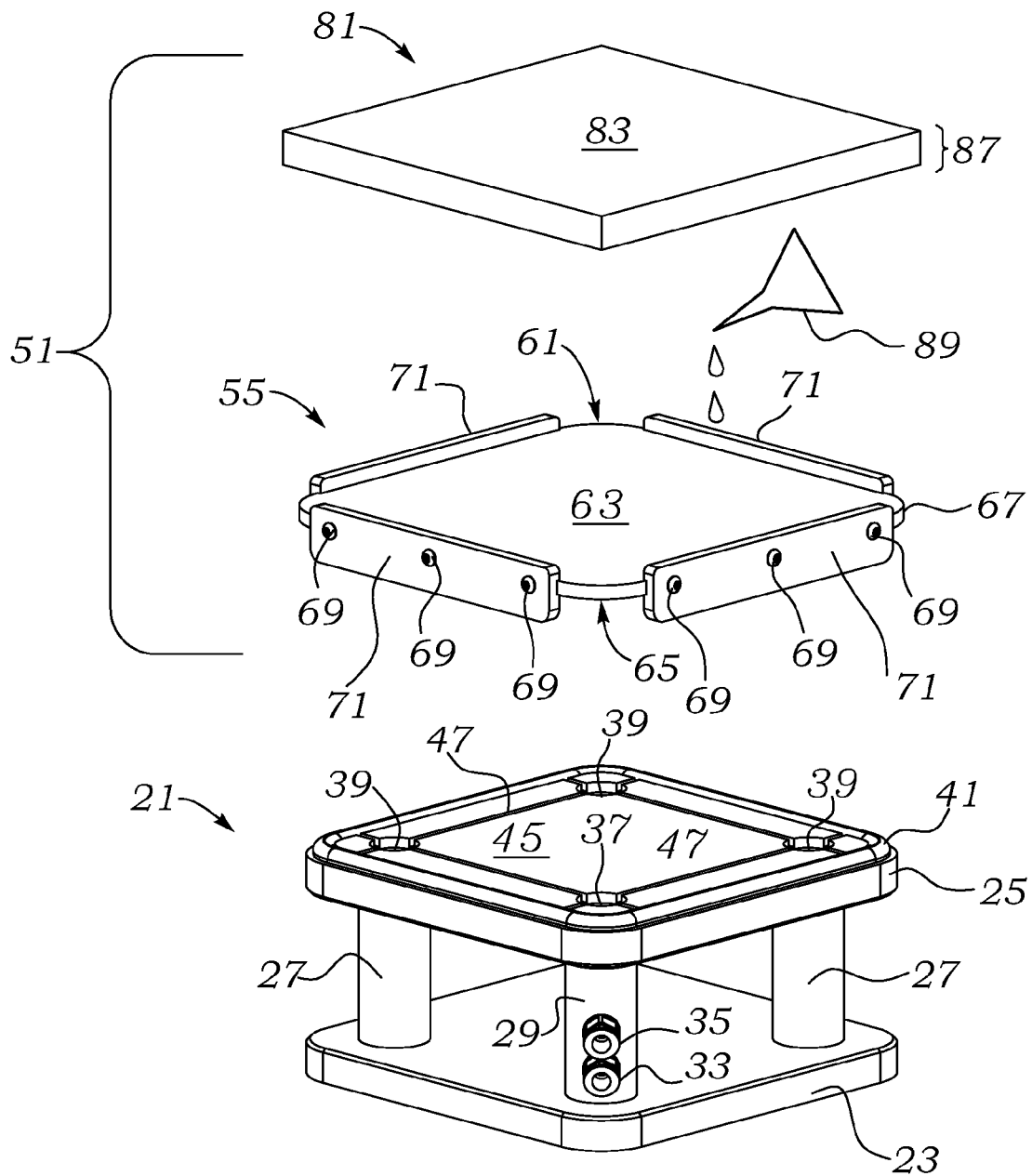
FIG. 1 is a perspective of a vertical exploded view of the containment lid of the invention overlying a vacuum hold down.

Referring to FIG. 1, a perspective of a vertical exploded view of the containment lid assembly of the invention overlying a vacuum hold down is shown. Beginning at the bottom of the Figure, a perspective view of a vacuum hold down support 21 is shown. Vacuum hold down support 21 can be of any height, area or shape including round, rectangular, irregular or square, but the embodiment shown has an overall square shape to maximize the area of support and to illustrate a simple construction.

The vacuum hold down support 21 has a base 23 at its lowermost extent and a top 25. The vacuum hold down support 21 has a set of four support columns 27 of which only three are seen, and one of which is a vacuum transmission column 29. Columns 27 and 29 support the top 25 with respect to the base 23. Vacuum transmission column 29 which supports a first vacuum input port 33 in communication with the area underneath the base 23 (to provide vacuum hold down of the vacuum hold down support 21) and a second vacuum input port 35 which is in fluid communication through a vacuum transmission bolt known as a vacuum head screw 37, having a vacuum transmission bore, the vacuum head screw 37 only partially seen in FIG. 1. The top 25 is attached to the other columns 27 using standard screws 39 of which a small area is only partially seen.

The top 25 is seen supporting an elastomeric seal 41 just inside and slightly above the periphery of the top 25. Just inside the elastomeric seal 41 is a generally planar hard elastomeric pad 45 held in by the vacuum head screw 37 and screws 39 which are countersunk to assume a reduced height profile with respect to the hard elastomeric pad 45 to insure that they will not contact the structure which will be supported by the vacuum hold down support 21. The hard elastomeric pad 45 has a series of grooves 47 to help transmit vacuum from the vacuum head screw 37 completely around the hard elastomeric pad 45.

Above the vacuum hold down support 21, a containment lid assembly or saw cup 51 is seen. The bottom member of the saw cup 51 is seen as including a containment lid 55 having a main plate 61 which non-porous and vacuumable, and is seen as having a general rectangular or square shape with rounded corners. Main plate 61 has a first surface 63 an opposite second surface 65, and a side surface 67. Side surface 67 can be seen at the corner of the main plate 61 as it is uncovered to prevent any water entrapment which might otherwise collect at the first surface 63. To the side surface 67, a series of from two to five or more screws 69 attach what is shown as a simple vertical containment plate 71. The combination of the main plate 61, and vertical containment plates 71 held in place by its associated series of screws 69 form containment lid 55.

A series of four vertical containment plates 71 are seen which are appropriate to provide translational stability in a four sided structure. The portions of the vertical containment plates 71 which extend below the main plate 61 are dimensioned to fit over the side surfaces of the top 25 so that the containment lid 55 will be appropriately registered over the top 25 before an upper vacuum is applied to hold the containment lid 55 fully onto the surface of the vacuum hold down support 21. The portion of vertical containment plates 71 which extend below plate 61 also prevents slide or lateral movement with respect to the vacuum hold down support 21 when no vacuum is being applied.

The vertical containment plates 71 are shown as simplistic members, but need not be so in actual realization. Vertical containment plates 71 can be thicker, can include a formed shape which can fit other shapes of vacuum hold down supports 21 which are other than rectangular shaped. Further, containment lid 55 may be made of a plastic material which would not resist limited cutting, but would otherwise remain in tact if the upwardly extending portions of it were cut or scored. The lateral registration ability of the containment plates 71 which extend downwardly of the main plate 61 insure that it will be vacuum held every time without having to worry about insuring that the plate 61 is sufficiently located atop the vacuum hold down support 21 to be vacuum engaged.

Although the containment lid 55 is shown as a main plate 61 with a vertical containment plate 71 held in place with a series of screws 69, the containment lid 55 could be made of one piece of material, or in the alternative a multi component structure formed integrally (to be shown). Other structures are possible. Other structures can be used to attach the vertical containment plates 71 to the main plate 61. However, a one piece structure offers the simplest construction with potentially the strongest lateral holding ability.

Above the containment lid 55 is an expanse of a sacrificial, scorable, cementitious material board, and which may preferably be a cement board 81, also known as tile backer, and which is sometimes sold commercially under the trade name HARDIBACKER™. The sacrificial nature of such a sacrificial board is that it accepts a limited penetration of a saw blade in order to protect more substantial structures supporting it, but it also has the capability of solid non-compressible support. The type of cement board 81 used is preferably a rigid non warping board having the ability to support high load between its main surfaces, but which is easily cuttable with a circular saw. Cement board 81 has an upper surface 83 and a lower surface 85 and a side face 87 whose height is the thickness of the board.

As can be seen the cement board 81 fits inside and is laterally registered by the portion of the vertical containment plate 71 which extends above the main plate 61. It may be preferable if the fit of the cement board 81 within the confines of portion of the vertical containment plate 71 which extends above the main plate 61 to be closely toleranced, and the cement board 81 can be laid in if desired. However, even any potential slippage between the main plate 61 and the cement board 81 can be reduced by adding a volume of bonding material 89, such as silicone, or contact cement, or any material which is compatible to secure the cement board 81 material to the main plate 61 material, if desired. Further, the tolerance between the cement board 81 and the vertical containment plates can be close enough for an interference fit if desired, depending upon the materials and tolerances of the containment lid 55 upwardly projecting skirts of the vertical containment plates 71. The area of the first surface 63 of the main plate 61 and the area of the lower surface 85 of the cement board 81 provides a significant bonding area if cement is desired and which will easily resist lateral displacement of the bonded pair. The containment assembly 55 can have rounded corners even though it can be utilized with an expanse of cement board 81 which is square or rectangular.

In terms of dimensioning, the thickness of the cement board 81 should be set to a thickness greater than the expected depth to which a saw blade (not yet shown) is expected to penetrate a slab to be cut (also not yet shown). One example of a set of dimensions which has been shown to work well involves the thickness of the cement board 81 and thus the height of the side face 87 as being about a half of an inch, or 12.7 millimeters. The height of the vertical containment plate 71 above the main plate 61 is about one quarter of an inch and thus a saw need not cut into the vertical containment plate 71 at all. Thus the saw settings may preferably be set such that no more than one eighth of an inch of depth of the expanse of cement board 81 is cut so that the vertical containment plate 71 is not typically cut. This would enable a saw blade to be set and expected to penetrate below the slab of material to be cut by no more than one eighth to one quarter of an inch. Since the upper surface 83 of cement board 81 will make direct and bearing contact with the underside of a slab of material to be sawed, the extent to which a saw blade will extend beyond the bottom surface of the slab to be cut, will be extent to which a saw blade will penetrate the into the cement board 81 beyond the upper surface 83. The thickness of the side face 87 of cement board 81 should be sufficiently great that the saw blade will not penetrate beyond the cement board 81 and into the main plate 61.

Other dimensions which have been found to work well include a main plate 61 thickness of about one quarter of an inch. The vertical containment plate 71 may have a top to bottom height of about an inch or about 25 millimeters. In one embodiment the amount of the vertical containment plate 71 which extends about the main plate 61 may be about five to six millimeters while the amount of the vertical containment plate 71 which extends below the main plate 61 may be about thirteen millimeters with about five to six millimeters covering the side face 87 of the main plate 61. Further, the vertical containment plates 71 may be molded. It is expected that the saw cup 51 will be manufactured to a size slightly larger and of the same shape as the vacuum hold down such as vacuum hold down support 21 upon which it is placed so that it can be properly and easily located.

Figure 2:
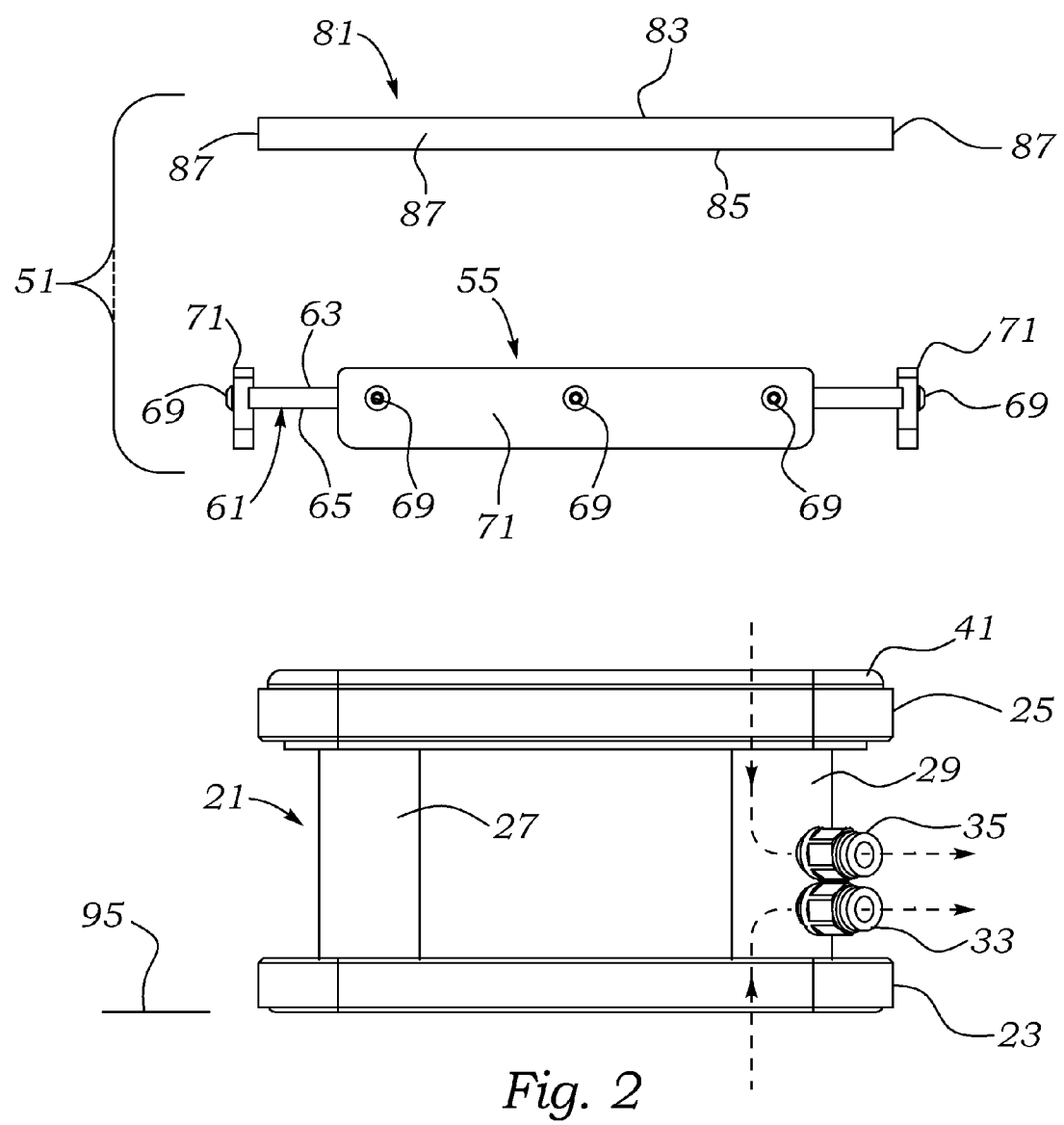
FIG. 2 is a plan view of the exploded relationship in FIG. 1.

Referring to FIG. 2, a plan view of the still exploded relationship in FIG. 1 is shown to give a better idea of the plan profile of the structures seen in FIG. 1. The vacuum hold down is shown supported by a working table 95 schematically shown by a line. As is shown Schematically by dashed line arrow indication, first vacuum input port 33 is seen withdrawing air to create a vacuum between the working table 95 and the hold down 21. Likewise, second vacuum input port 35 is seen withdrawing air from above the top 24 to vacuum attach the containment lid 55 of the saw cup 51 onto the vacuum hold down support 21. The first vacuum input port 33 and second vacuum input port 35 will be connected to controlled lines (not shown) which will transmit vacuum to the vacuum hold down support 21. In practice the expanse of cement board 81 will be affixed to the containment lid 55 by the bonding material 89 and the containment lid assemblies 51 will be stored and deployed as a number of units which can be retrieved and simply placed atop the correspondingly sized vacuum hold downs which would otherwise be used for other purposes.

Figure 3:
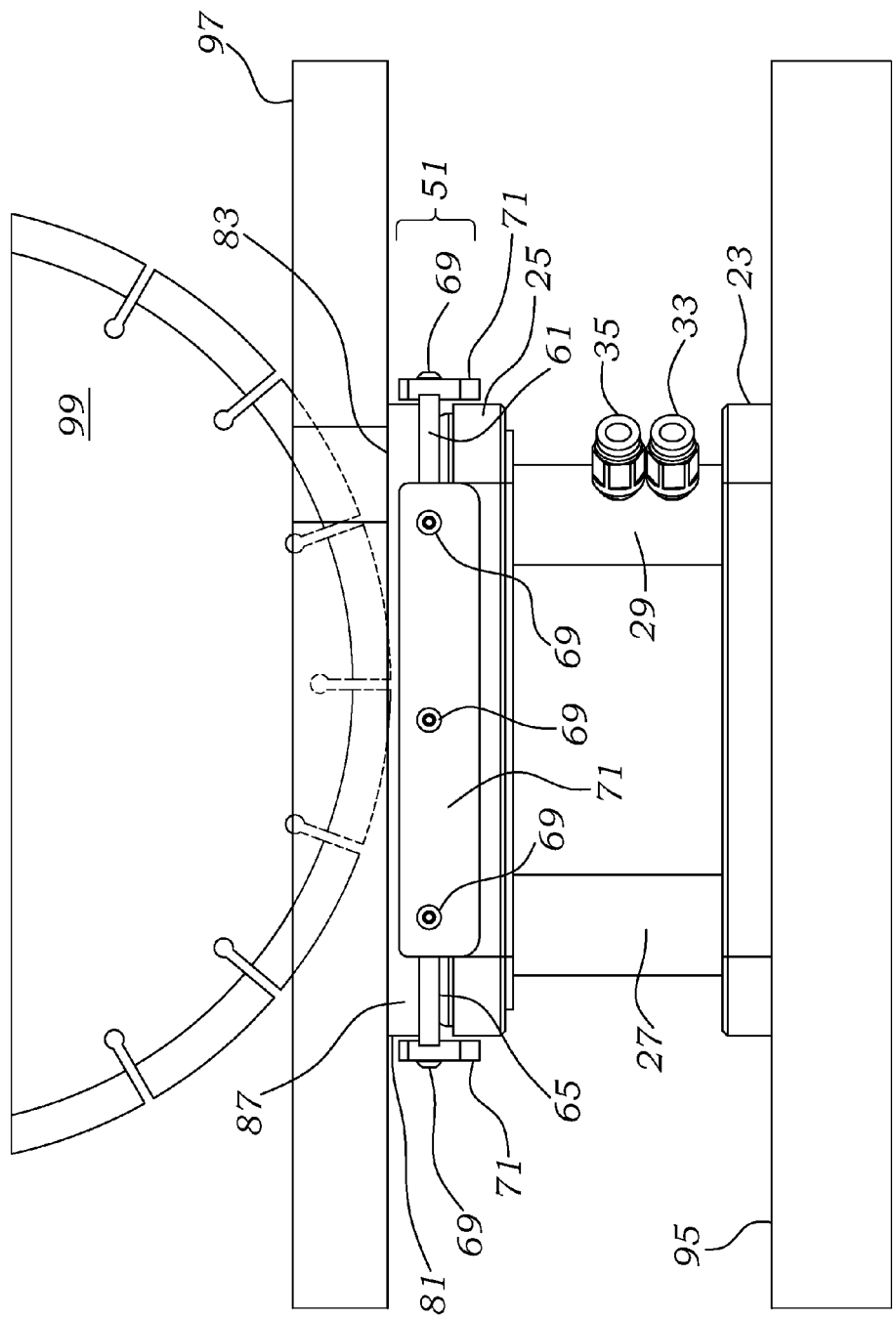
FIG. 3 is a side view of the assembled the vacuum hold down and containment lid assembly is shown in working position on a working table along with a slab of material being cut and saw blade in a cutting position.

Referring to FIG. 3, a side view of the assembled the vacuum hold down support 21 and saw cup 51 is shown in working position on the working table 95 along with a slab of material hereafter as slab 97 and a saw blade 99. As a result, the cement board is scored by the formation of a small slot of very narrow width corresponding to the width of the saw blade 99 making the cut. New cuts are random and in some cases over the same groove, and many cuts can be made before the contact surface is sufficiently denigrated so as to cause replacement. As a result, the cement board 81 would have to be scored many times before it would be impaired.

Note that for a given slab 97, support may be had from only a few saw cups 51 and these saw cups 51 do not have to be configured into any sort of pattern in an attempt to avoid the saw blade 99. Where a sawing operation is to be performed repeatedly, it may be expected that in some cases a cut which is established into the expanse of cement board 81 is repeated, thus reducing the number of cuts that the expanse of cement board 81 may suffer. Vacuum does not hold the bottom of the slab 97 for sawing; it is the weight and friction of the slab 97 onto the expanse of cement board 81 that provides stabilization for sawing. In actual use, the saw cup 51 can be sawably scored many times before the user has to replace the expanse of cement board 81. If any part of the saw cup 51 becomes inadvertently damaged it may be discarded and replaced at low cost.

In terms of operation, and where perhaps ten vacuum hold downs 21 were present upon a support table, a user would simply gather ten saw cups 51, place each one over an associated vacuum hold down support 21 and then apply a vacuum to a top 25 of the vacuum hold down supports 21 and then slide in a slab 97. Without a vacuum hold down support 21, an abbreviated area expanse of cement board 81, even with a holder would tend to be relatively easily slidably displaced. Because the effective loading surface represented by the held down saw cups 51 is both vertically and laterally stable, the slab 97 can even be frictionally slid across the saw cups 51 without disturbing them since it is the vacuum force which holds the saw cups 51 down. The sawing operation is not expected to exert any significant sliding force unless the blade 99 is unduly dull.

Figure 4:
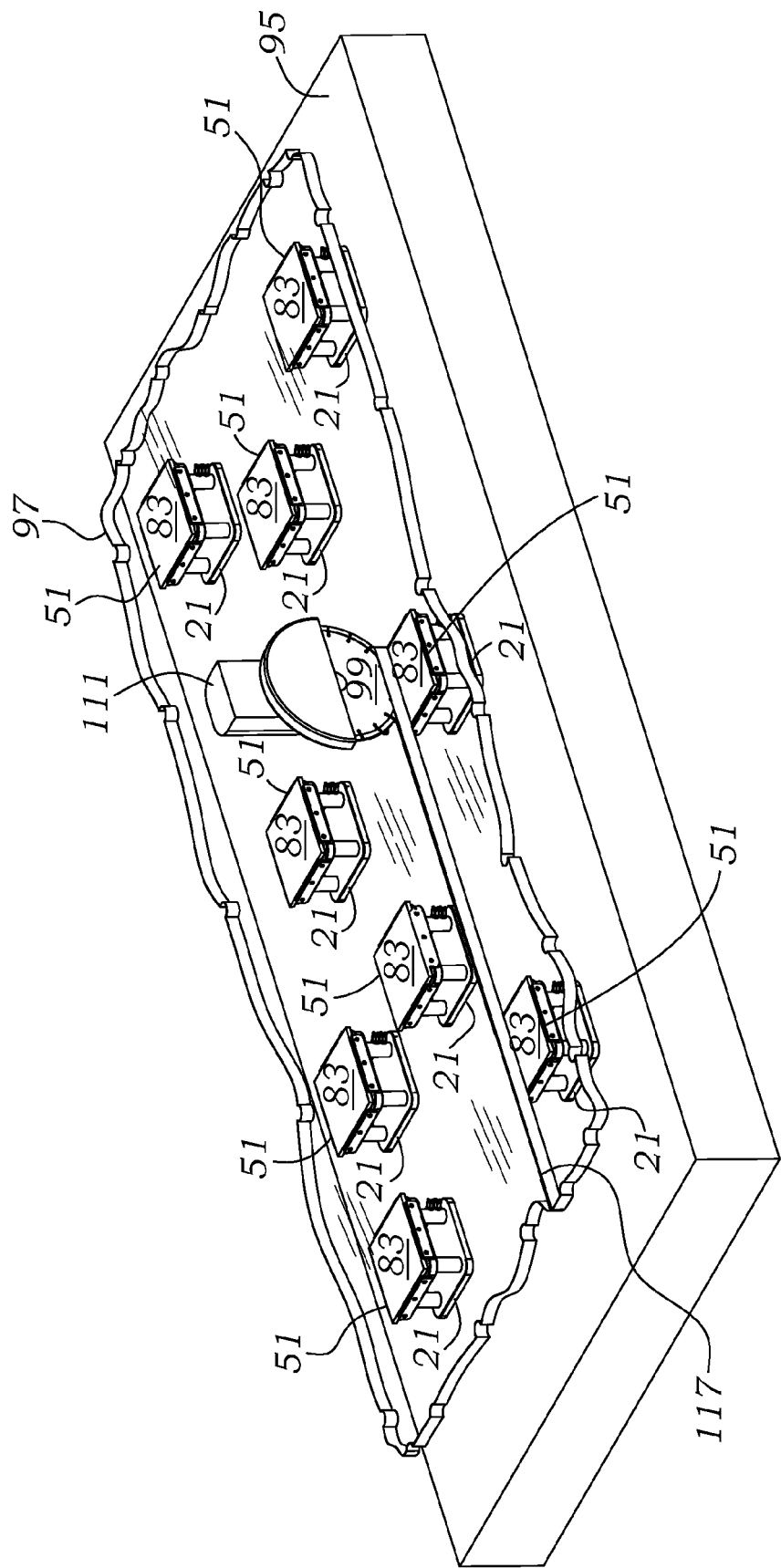
FIG. 4 is a perspective view of a slab of material to be cut shown in transparent format to illustrate a working table supporting an array of vacuum hold downs supporting the containment lid assembly which in turn supports the slab of material to be cut.

Referring to FIG. 4, a perspective view of slab 97 of material to be cut shown in transparent format to illustrate a working table supporting a number of variously arranged vacuum hold down supports 21 supporting the saw cup 51 which in turn supports the slab 97. A motor unit 111 typically has a spindle which turns about a vertical axis and is shown as having been converted to movement of the saw blade 99 about a horizontal axis.

Also seen in a series of unevenly spaced vacuum supports 21 which support a corresponding set of containment lid assemblies 51 which have expanses of cement board 81 which bear against the underside of the slab 97. For clarity, the vacuum lines which would normally extend onto the working table 95 have been omitted. A cut line 117 as one possible path for the saw blade 99 to follow and it is shown cutting directly over two of the saw cups 51. Note that the vacuum hold down supports 21 are configured to support the material to be cut. The arrangement of vacuum hold down supports 21 supporting the saw cups 51 may be positioned in an arrangement consistent with later edge processing of the material. Note also that the example shown is a cut in a straight line as cut line 117, but that such a cut line 117 can be any angle through the supported plane.

Figure 5:
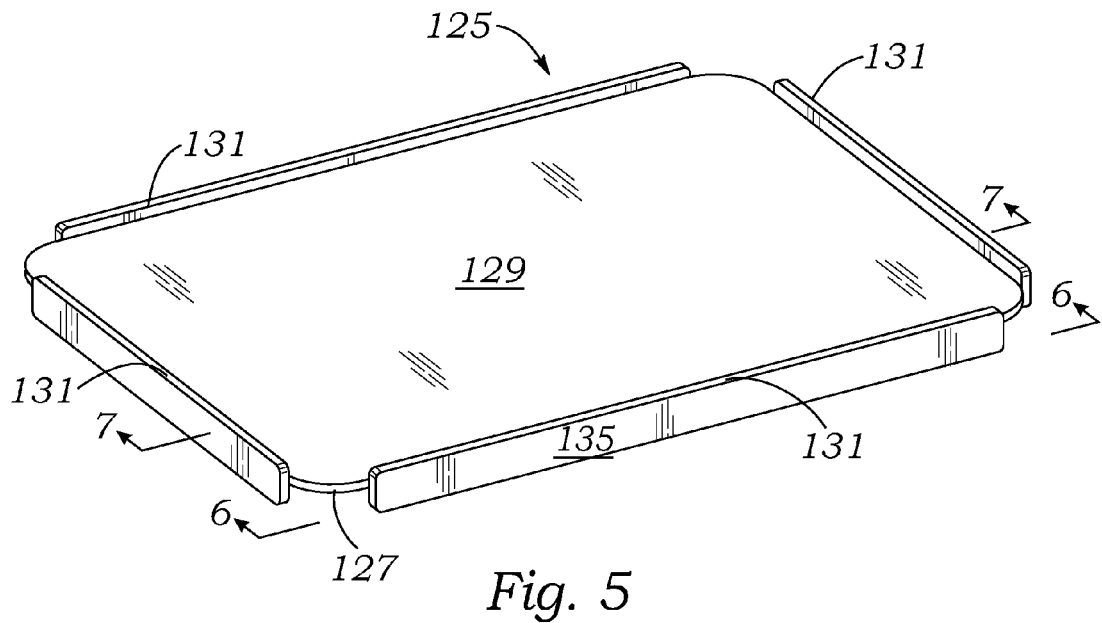
FIG. 5 is a perspective view of a one piece containment lid similar to the containment lid shown in FIG. 1 having assembled elements.

As was mentioned earlier, the containment lid 55 can be made from any number of materials and individual components. Referring to FIG. 5, a perspective view of a one piece containment lid 125 is shown. One-piece containment lid 125 may preferably be formed from one piece of material such as injection molding and has a main plate 127 portion having an upper surface 129. Upper surface 129 is bound by an upper wall 131. Upper wall 131 is about the same dimension of the vertical containment plate 71 above the main plate 61 as was the case for the containment lid 55. Because the one piece containment lid 125 is made of a plastic sacrificial material of similar type to the vertical containment plate 71 seen in FIGS. 1 and 2, it is the upper wall 131 which may be sacrificial.

Rather than changing out the vertical containment plates 71, as was the case for containment lid 55, the single piece, preferably plastic containment lid 125 can be discarded or re-cycled when the upper wall 131, and/or the expanse of cement board 81 has suffered enough sacrificial scoring cuts such that the saw cup 51 which includes the one piece containment lid 55 needs replacing. This is not to say that the one piece containment lid 125 cannot have its expanse of cement board 81 replaced.

Figure 6:
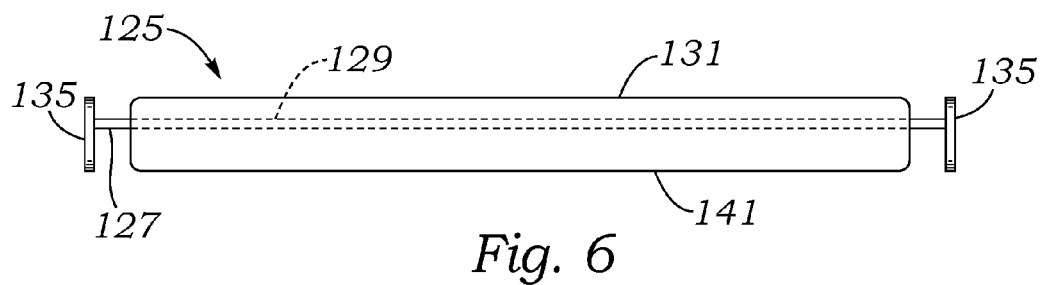
FIG. 6 is a plan view of the containment lid of FIG. 5 and taken along line 6-6 of FIG. 5.

Referring to FIG. 6, a plan view taken along line 6-6 of FIG. 5 and looking into outer surface 135 of the containment lid 125 is shown. A lower surface 139 of main plate 127 is seen in phantom. Seen for the first time is a wall 141 at a bottom edge of the outer surface 135. As was the case for the containment lid 55, the wall 131 is not as high with respect to main plate 127 as is wall 141.

Figure 7:
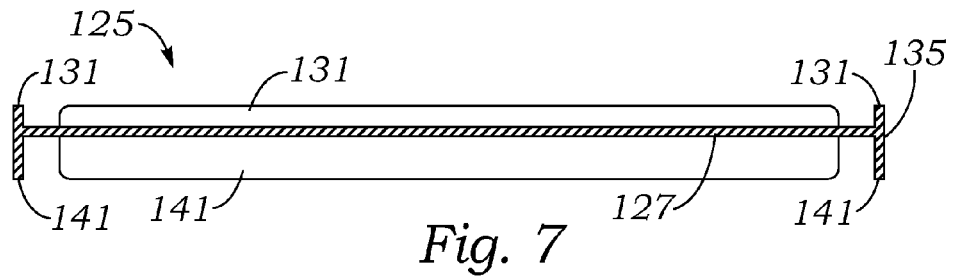
FIG. 7 is a sectional view of the containment lid of FIGS. 5 and 6 and taken along line 7-7 of FIG. 5.

Referring to FIG. 7, a sectional view taken along line 7-7 of FIG. 5 illustrates the relative height profiles of the oppositely oriented walls 131 and 141 with respect to the plate 127. Further the expanse of cement board 81 may have rounded or square corners. Any combination of shapes is permitted so long as good support and good fit can give stability to the expanse of cement board 81.

While the present invention has been described in terms of a device and system used in conjunction with a working table utilizable with a cutting saw, and in particular a system which elevates the slab while guarding the vacuum hold downs with a sacrificial material and holder which will protect the vacuum hold down, one skilled in the art will realize that the structure and techniques of the present invention can be applied to many appliances.

Although the invention has been derived with reference to particular illustrative embodiments thereof, many changes and modifications of the invention may become apparent to those skilled in the art without departing from the spirit and scope of the invention. Therefore, included within the patent warranted herein are all such changes and modifications as may reasonably and properly be included within the scope of this contribution to the art.

What is claimed:

1. A containment lid assembly for use in conjunction with a vacuum hold down for supporting a work piece for sawing comprising:
    a main plate having a first surface for supporting a sacrificial board, and a second surface opposite the first surface for attachment onto a vacuum hold down support;
    a plurality of first walls extending away from the first surface for laterally stabilizing the sacrificial board;
    a plurality of second walls extending away from the second surface for laterally registering the main plate with respect to the vacuum hold down support, and wherein the main plate, plurality of first walls and plurality of second walls are integrally formed from plastic material; and
    a sacrificial cement board laterally fixed against the first surface of the main plate.

2. A containment lid assembly for use in conjunction with a vacuum hold down for supporting a work piece for sawing comprising:
- a sacrificial board;
- a main plate having a first surface for supporting the sacrificial board, and a second surface opposite the first surface for attachment onto a vacuum hold down support;
- a vertical containment plate extending below the main plate for laterally registering the containment lid assembly onto a vacuum hold down support and extending above the plate for laterally fixing the sacrificial board, and wherein the vertical containment plate is less hard than the main plate and has a cutting softness nearer to the sacrificial board than the main plate.

3. The containment lid assembly for use in conjunction with a vacuum hold down for supporting a work piece for sawing as recited in claim 2 and further comprising a layer of adhesive between the main plate and the sacrificial board to hold the sacrificial board in place with respect to the main plate.

4. The containment lid assembly for use in conjunction with a vacuum hold down for supporting a work piece for sawing as recited in claim 3 wherein the sacrificial board is cement board.

* * * * *